United States Patent Office 2,707,667
Patented May 3, 1955

2,707,667

TANNING LIMED SKINS

Douglas K. Severn, Norwichtown, Conn., assignor to E. I. du Pont de Nemours and Company, Wilmington, Del., a corporation of Delaware No Drawing. Application April 18, 1951,
Serial No. 221,730

7 Claims. (Cl. 8—94.26)

This invention relates to the production of leather. It is more particularly directed to the tanning of skins by subjecting them in a limed condition to a copolymer of styrene-maleic anhydride and thereafter treating the skins with a tanning composition containing at least one water-soluble metal salt, the metal group of the salt being of the class consisting of titanium, chromium, aluminum and zirconium.

Graves Patent 2,205,882 and Kirk Patent 2,205,901 describe processes for tanning skins using copolymers of styrene and maleic anhydride as tanning agents. These processes preferably effect the reaction of skin substances, in the form of depickled stock, and copolymer at an initial pH of from about 4.8 to 5.7. Preparatory to obtaining depickled stock, the skins are unhaired, limed, delimed, bated and pickled. After penetration of the skins by the polymeric styrene-maleic anhydride, the pH of the tanning solution is lowered to from about 3.4 to 4.2 to effect complete tanning.

While the processes taught by Graves and Kirk are good, the preparatory steps of bating, pickling and depickling take time and are costly. A process eliminating these steps without sacrifice in quality of the resulting leather would be advantageous and has been sought.

Now according to the present invention, processes for producing leather are provided in which skins in a limed condition are subjected directly to the action of a copolymer of styrene and maleic anhydride, and thereafter are treated with at least one water-soluble metal salt, the metal of the salt being selected from the class consisting of titanium, chromium, aluminum and zirconium.

The processes of my invention can be used for the treatment of any type of skin suitable for conversion into leather. It will be understood that the term "skin" as used herein includes heavy skins such as cowhide and lighter skins such as, for instance, goatskin, calfskin, Cabretta and kangaroo. The processes should, of course, be adapted to the type of skin to be treated. For instance, goatskin may be more rapidly tanned than calfskin. Those skilled in the art are well aware of such factors and may readily adapt the processes of the present invention to the needs of particular specialized problems.

Skins to be tanned according to the processes of my invention are prepared by depilation and liming. Since the technique of liming and depilation is already well understood, it need not be described in detail. Briefly, the skins after having been soaked are immersed in an unhairing solution. The principal constituents of the solution are hydrated lime [$Ca(OH)_2$] and water. Preferably, a "sharpener" is added to expedite the depilation action. The skins are allowed to remain in contact with this suspension until the hair can be removed satisfactorily. After the hair is removed from the skins by mechanical means, the limed skins are washed. They are then ready for treatment in accordance with my invention.

The skins, which are in a limed condition, are treated directly with a tanning solution comprising a copolymer of styrene-maleic anhydride. Copolymers of styrene and maleic anhydride are well known resins. Methods of preparing them are already well understood and need not be described here in detail. In brief, styrene and maleic anhydride are preferably polymerized by dissolving them in xylene and heating the resulting solution in the presence of benzoyl peroxide to a temperature of about 100° C. for a period of from about 1 to 2 hours.

The preparation of a polymeric styrene-maleic anhydride tanning composition suitable for use in the invention is specifically described in the aforementioned Graves and Kirk patents.

It will be understood that the term "limed" condition, as used herein, refers to a condition of acidity within the range of from about pH 8 to pH 13. A skin in a limed condition is, in other words, one which has not been subjected to the intervening steps of bating and pickling. For the tanning of cowhide, the limed hide is preferably at pH 11 at the start of the tanning process.

During the step of tanning the skin with the copolymer, the pH of the skin and tanning solution may fall to about 7.5. At the end of the drumming period, the pH of the skin is preferably in the range of from 8.0 to 8.5. Following drumming, it is preferred to lower the pH to from 4.2 to 5.0 in order to effect complete tanning.

The polymeric styrene-maleic anhydride tanning composition is preferably used in aqueous media. It is easier and more practical, for most purposes, to render the styrene-maleic anhydride copolymer water-soluble at the start of the tanning operation by at least partial neutralization with aqueous alkali metal hydroxides or carbonates, or ammonium hydroxide or organic bases. It will be understood that the pH of the aqueous solution of neutralized copolymer should not be such as to cause the pH of the limed stock tanning mixture to fall below 7.5 during the drumming period.

After having been subjected to the action of a copolymer of styrene and maleic anhydride in the manner already described, the skin is treated, according to processes of my invention, with a tanning composition of the group consisting of a water-soluble salt of titanium, a water-soluble salt of aluminum, a water soluble salt of chromium, and a water-soluble salt of zirconium.

There is considerable latitude in the pH and temperature at which after tanning with a water-soluble metal salt may be accomplished and also in the relative weights of the salts employed. These proportions are, however, well within the skill of those familiar with the tanning art.

While any water-soluble salt, such as, for instance, the sulfate, chloride, lactate, or acetate of the metals and mixtures thereof may be used, it is preferred to use salts of inorganic acids. More specifically, it is preferred to use the salt of an acid selected from the group consisting of nitric acid, sulfuric acid, hydrochloric acid and sulfamic acid. By far the best results have been obtained with the sulfates.

A preferred metal salt retanning composition for use in the processes of my invention is composed essentially of chromium sulfate. Commercially available tanning agents containing roughly 25 per cent $Cr_2O_3$ are especially well adapted for this purpose.

Particularly preferred retanning compositions comprise the titanium-iron mixtures described in my copending application, Serial No. 221,729, filed simultaneously herewith. A titanium-iron tanning composition useful in my invention comprises a solution of titanium sulfate and iron sulfate having a ratio of $TiO_2$ to $Fe_2O_3$ ranging from 2:1 to not exceeding 7:1. These compositions permit iron to be carried into the skin without gelling.

The first or second clarification liquors from the refining of a titanium-bearing ore such as ilmenite, rutile or the like may be employed to advantage in preparing the aforementioned compositions containing iron and titanium. The second clarification liquor is especially useful after coversion of its ferrous iron to the ferric condition. This can effected through oxidation with such agents as dichromate, hydrogen peroxide, chlorine, non-contaminating chlorates and the like. Ferrous iron may be present with the ferric iron in these titanium-iron compositions as fully disclosed in my copending application, Serial No. 221,729.

The styrene-maleic anhydride copolymer employed for the initial tanning of skins in accordance with the invention apparently form, probably through their free carboxyl groups, some kind of chemical complex with the skins. When the treated skin is retanned with the metallic salt, I believe that those carboxyl groups of the copolymer that have not become tied up directly to the skin substance are still beneficial to tanning since they react with the metal retan which in turn is tied up with the skin substance and are sequestered. This sequestration occurs, I believe, without separating the carboxyl groups previously linked to the skin substance.

The step of treating the skin with a metal salt in the processes of the present invention is not thought to be a neutralization of excess tanning agent. It is rather a tying up of only those carboxyl groups in the molecule which have not associated with the skin substance. The carboxyl groups of the copolymer which are unassociated with the skin substance thus are sequestered by the metal salt.

It will be understood that enough of the metal salt retannage should be used to effect satisfactory sequestration of any free carboxyl groups in the leather. At the same time, the amount should be enough to complete the job of tanning the skin. The exact amounts required in any instance can most readily be determined by inspection of the results obtained with increasingly larger amounts. The amount of salt, in general, is not critical provided there is sufficient persent to effect sequestration and to complete tanning. To be on the safe side one may use an excess of the metal salt.

It will be understood that the copolymer of styrene and maleic anhydride may, if desired, be used simultaneously with other tanning agents or tanning assistants, in manners known to the art. The copolymer may, for instance, be used in conjunction with vegetable tanning materials such as quebracho extract, with chrome tans, or with synthetic tanning agents containing sulfonic acid groups.

The treatment of the polymer-treated skin with a metal salt solution may frequently be modified to advantage by the presence of a neutralizing agent such as, for instance, sodium bicarbonate, magnesium oxide, soda ash, sodium hydroxide and the like. If desired, a portion of the agent may be added to the metal salt solution during its preparation. Magnesium oxide, also referred to as magnesia, is particulary preferred for this purpose.

The leather obtained according to the invention is completely tanned, well-drawn, plumped and in most instances light in color. If a retanning composition composed essentially of titanium and ferric iron is employed in a process of my invention, the resulting leather is considerably darker than polymer-treated skins retanned with a composition comprising a water-soluble titanium salt and a ferrous salt. The reaction of ferrous iron with the skin is not as complete as in the case of ferric iron. Consequently, by use of a retanning agent composed of titanium and iron which is predominantly in the ferrous state there is obtained a tanned skin having a conventional leather color.

One may, if desired, treat the leather prodced by the processes of my invention with a white pigment. The leather may also be colored during the last stages of the tanning process by the inclusion of any of the common leather dyes and pigments. The dyeing may be effected during the treatment with the metal salt solution.

Leather produced according to the process of my invention can be subjected to any of the various kinds of finishing treatments customarily used. The leather, if desired, may be suitably filled or given any of the numerous surface treatments customary to the art. The alkaline surface sizes such as the alkaline casein finishes commonly used in the art to treat white leather may satisfactorily be employed. In those instances in which a product having outstanding water resistance is desired, the leather may be treated with wax.

As has already been mentioned, the processes of my invention involve applying a tanning agent comprising a copolymer of styrene and maleic anhydride directly to the limed stock without bating, pickling or depickling preferably followed by acidification, and then followed by retanning with a water-soluble metal salt. The elimination of the conventional steps of bating, pickling and depickling is highly advantageous from an operational and cost standpoint. Handling of skin is lessend and time of processing is cut down.

Another important feature of the present invention lies in the fact that it permits commercially satisfactory application of polymeric styrene-maleic anhydride to heavier skins. Penetration of the polymeric tanning agent into the skin is greatly accelerated. For example, using pickled stock a period of from 30 to 40 hours is required to achieve quarter inch penetration of the styrene-maleic anhydride copolymer into the skin. According to the present invention, penetration of the polymeric styrene-maleic anhydride into belly centers (cowhides) to a depth of one quarter inch has been achieved in a period of 3 hours or less.

The products obtained by my novel processes are especially useful as sole leather and side leather. They may be used to advantage in novelty leather articles such as handbags, belts, billfolds, and shoe upper leathers. Lighter leather such as kidskin prepared by a process of the invention may also be used for suede or grain leather.

In order that my invention may be better understood reference should be had to the following illustrative examples:

*Example 1*

Twenty-six pounds of belly centers of cowhide are limed, dehaired, fleshed and washed. The washed limed stock is rinsed for a period of 5 minutes in salt water. The stock which is at a pH of 11, is then ready for treatment with polymeric styrene-maleic anhydride.

To a tanning drum there is added 1200 grams of a partially neutralized copolymer of styrene and maleic anhydride (10 per cent by weight based on the limed stock) dissolved in 5 liters of water. Penetration of the hide by the resin is completed in a period of 3 hours. The liquor length during the drumming is 6 gallon per cent. The term "gallon per cent" as used herein refers to the number of gallons of water per 100 pounds of drained limed weight.

The final pH of the liquor after drumming is about 8.3. The shrink temperature in water at this point is 140° F. The term "shrinkage temperature," also referred to as "shrink temperature," is one well known in the art. Its definition and a method of determination are fully described on pages 133 and 134 of McLaughlin and Theis' "Chemistry of Leather Manufacture," Reinhold Publishing Corporation, New York, N. Y., 1945. In brief, when leather is gradually heated in an aqueous medium a temperature will be found at which notable shrinkage occurs. This is defined as the shrinkage temperature.

Without draining the liquor from the drum, a metallic aftertanning composition is added to the liquor in a drum over a period of 30 minutes. The aqueous aftertan solution is composed of 400 grams of titanyl sulfate (3.3% based on limed weight and calculated as TiOSO₄), 200 grams of iron sulfate (1.7% based on limed weight and calculated as FeSO₄), 220 grams of magnesia, and 100 grams of hydrogen peroxide, and has a total volume of 2½ liters. Its pH is about 1.5.

After the aftertan has been added, the total liquor length is 12 gallon per cent. The pH is 4.2 at the beginning of the drumming period. Upon completion of the drumming cycle in one hour, the pH of the skin and liquor is about 2.0. Neutralization is effected with 176 grams of magnesium oxide in 16 feeds at five-minute intervals. The final pH of the liquor is 3.8. The shrink temperature of the tanned skin is 176° F.

The resulting tanned skins are plumped with no grain cracking. The leather produced is particularly well suited for use as innersoles.

It is to be understood that the leather obtained by treatment of limed stock with polymeric styrene-maleic anhydride is satisfactory for some uses without the subsequent metallic aftertannage as shown in the above example. It is more practical, however, for most purposes, to follow the resin treatment of the skins with a metal aftertannage.

*Example 2*

Fourteen and one-half pounds of lime split grains from belly centers (roughly 21 sq. ft.) with a pH of about 11 is washed for a period of 5 minutes to remove sawdust and other extraneous materials. At this point, 10% of the limed stock weight (roughly 600 grams) of partially neutralized styrene-maleic anhydride copolymer is added, together with four liters of water at room temperature. After drumming the mixture for a period of one hour, the skins have a pH of 7. The skins are appreciably plumped.

After a total drumming time of 1½ hours, skins and tanning solution are acidified with hydrochloric acid in the amount of 1.5 per cent (100 grams) in one liter of water in three feeds. The skins are then drummed for a period of 2½ hours. At the end of the drumming, the pH of the skin and liquor is 4.3. The copolymer is completely exhausted from the solution. The skins have a shrink temperature of about 145° F. The skins are then washed for a period of 5 minutes with water at room temperature and retained with a titanium-iron mixture.

The titanium-iron mixture employed is prepared as follows:

To 1 liter of material containing an equivalent of 160 grams of TiO₂ and 46 grams of Fe₂O₃, there is added an additional four liters of water and 275 grams of crude solid ferric sulfate (73% strength). After these materials have dissolved, the resulting solution is oxidized with 65 grams of 30% hydrogen peroxide solution. At this point, a total of 136 grams of technical magnesium oxide (91% strength) is added. The resulting mixture is stirred over a 15 minute period and has a pH of 2.0.

The titanium-iron retanning mixture is then added to the washed, polymer-treated skins. Drumming is continued for a period of two hours. Further neutralization is then effected by adding a total of 55 grams of magnesium oxide at a concentration of 11 grams per 100 cc. of water at 10 minute intervals until the supply is exhausted. The tanned skins have a pH of 3.5.

The skins thus tanned have a shrink temperature of 185° F., and are light yellow in color.

*Example 3*

Following the tanning of 8 pounds of limed cowhide with a partially neutralized copolymer of styrene-maleic anhydride as described in Example 1, retanning of limed cowhide is carried out with chrome as follows:

To the polymer-treated limestock tannage there is added 6% of "Tanolin R," based on lime weight, which contains 33⅓ % reduced chrome salt (Cr₂O₃) (220 grams), 2% of sodium formate (75 grams), and 4 liters of water. After drumming the hides for a period of two hours, at a pH of from 4.0 to 4.2, the chrome is completely exhausted and the liquor removed. There is no neutralization. The leather has a shrinkage temperature of 212° F. for 5 minutes.

*Example 4*

To 10 pounds of washed limestock-styrene maleic anhydride reaction product prepared as in Example 1, there is added 10% by weight of zirconium sulfate at a pH of from about 2.5 to 3.0. Adjustment to this pH of the polymer-treated limestock material is made by use of the appropriate amount of hydrochloric acid 20° Bé., which is roughly 2% based on the lime weight. After a drumming period of two hours, the pH of the skins is raised by means of sodium bicarbonate solution (1.5% by weight) to a value of between 4 and 4.5. The shrinkage temperature of the resulting leather is 212° F. for 5 minutes.

*Example 5*

To 10 pounds of polymer-treated limestock reaction product prepared as in Example 2, there is added a tanning composition composed of 5 percent by weight of limestock of a reduced chrome salt (33⅓ % Cr₂O₃) and 1 per cent of iron-free alum. The resulting mixture is drummed for a period of three hours. Neutralization of the mixture is effected by adding about 1.5 per cent of sodium bicarbonate, its pH being raised from 4.0 to 4.8.

The resulting skins have a shrink temperature of 212° F. for five minutes.

*Example 6*

A process identical to that of Example 2 is carried out with the exceptions that kidskin is substituted for belly centers (cowhide) and alum is substituted for "Tanolin R."

To 10 pounds of the polymer treated limed kidskin there is added 6 per cent of iron-free alum, $$Al_2(SO_4)_3.18H_2O$$

based on the limestock weight. The resulting mixture is drummed for a period of two hours. Tanning of the skins is completed by the addition of 2% sodium bicarbonate in 1% feeds. The pH of the skins rises to about 4.5 during this addition. The skins so treated show a boil temperature of about 178 to 180° F. They are especially suited for white leathers.

I claim:

1. In a process for the tanning of skins, the steps comprising applying a styrene-maleic anhydride copolymer to a skin in a limed condition without intervening bating and pickling steps, and maintaining the pH of the skin not lower than 7.5 during drumming of the skin with said copolymer, and then applying to the drummed skin at least one water-soluble metal tanning salt, the metal group of said salt being selected from the class consisting of titanium, aluminum, zirconium and chromium.

2. In a process for the tanning of skins, the steps comprising applying a styrene-maleic anhydride copolymer to a skin in a limed condition without intervening bating and pickling steps, and maintaining the pH of the skin not lower than 7.5 during drumming of the skin with said copolymer, and then applying to the drummed skin a tanning agent comprising a water-soluble salt of chromium.

3. In a process for the tanning of skins, the steps comprising applying a styrene-maleic anhydride copolymer to a skin in a limed condition without intervening bating and pickling steps, and maintaining the pH of the skin not lower than 7.5 during drumming of the skin with said copolymer, and then applying to the drummed skin a tanning agent comprising a water-soluble salt of titanium.

4. In a process for the tanning of skins, the steps comprising applying a styrene-maleic anhydride copolymer to a skin in a limed condition without intervening bating and pickling steps, and maintaining the pH of the skin not lower than 7.5 during drumming of the skin with said copolymer, and then applying to the drummed skin a tanning composition comprising a water-soluble salt of iron and a water-soluble salt of titanium, the molar ratio of $TiO_2$ to $Fe_2O_3$ in said composition being at least 2:1 but not greater than 7:1.

5. In a process for the tanning of skins, the steps comprising applying a styrene-maleic anhydride copolymer to a skin in a limed condition without intervening bating and pickling steps, and maintaining the pH of the skin not lower than 7.5 during drumming of the skin with said copolymer, and then applying to the drummed skin a tanning composition comprising a water-soluble salt of iron and a water-soluble salt of titanium, the molar ratio of $TiO_2$ to $Fe_2O_3$ in said composition being at least 2:1 but not greater than 7:1, and the treatment with the salts being effected in the presence of a compound selected from the group consisting of magnesium oxide and aluminum sulfate.

6. In a process for the tanning of cowhide, the steps comprising applying a copolymer of styrene and maleic anhydride to the cowhide in a limed condition without intervening bating and pickling, maintaining the pH of the cowhide not lower than 7.5 during drumming of the cowhide with the copolymer, and then applying to the drummed cowhide an aqueous tanning composition consisting essentially of titanyl sulfate, ferrous sulfate, magnesia, hydrogen peroxide and water.

7. In a process for the tanning of skins, the steps comprising applying a styrene-maleic anhydride copolymer to a skin in a limed condition without intervening bating and pickling steps, and maintaining the pH of the skin not lower than 7.5 during drumming of the skin with said copolymer.

References Cited in the file of this patent

UNITED STATES PATENTS

| | | |
|---|---|---|
| 1,934,778 | Teichmann et al. | Nov. 14, 1933 |
| 1,941,285 | Teichmann et al. | Dec. 26, 1933 |
| 1,982,586 | Vogel | Nov. 27, 1934 |
| 2,089,180 | Bousquet et al. | Aug. 10, 1937 |
| 2,147,533 | Katzoff | Feb. 14, 1939 |
| 2,205,882 | Graves | June 25, 1940 |
| 2,205,901 | Kirk | June 25, 1940 |
| 2,220,867 | Kirk | Nov. 5, 1940 |
| 2,313,728 | Austen | Mar. 16, 1943 |

FOREIGN PATENTS

| | | |
|---|---|---|
| 11,092 | Great Britain | 1901 |

OTHER REFERENCES

"Progress in Leather Science 1920–1945," page 195, published 1948 by British Leather Mfg. Res. Assoc., London, England.